(12) United States Patent
Babu

(10) Patent No.: US 11,558,465 B2
(45) Date of Patent: Jan. 17, 2023

(54) APPARATUS, SYSTEM, AND METHOD FOR WIRELESSLY ACCESSING MANAGEMENT INTERFACES OF ROUTERS

(71) Applicant: Juniper Networks, Inc., Sunnyvale, CA (US)

(72) Inventor: Balaji Babu, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 17 days.

(21) Appl. No.: 16/907,778

(22) Filed: Jun. 22, 2020

(65) Prior Publication Data
US 2021/0352147 A1    Nov. 11, 2021

(51) Int. Cl.
| H04L 67/125 | (2022.01) |
| H04L 43/062 | (2022.01) |
| H04W 76/10 | (2018.01) |
| H04L 61/5007 | (2022.01) |

(52) U.S. Cl.
CPC .......... *H04L 67/125* (2013.01); *H04L 43/062* (2013.01); *H04L 61/5007* (2022.05); *H04W 76/10* (2018.02)

(58) Field of Classification Search
CPC . H04L 67/125; H04L 43/062; H04L 61/2007; H04W 76/10
USPC ....................................................... 370/328
See application file for complete search history.

(56) References Cited

U.S. PATENT DOCUMENTS

| 2007/0038739 | A1* | 2/2007 | Tucker | H04L 67/38 709/224 |
| 2015/0181460 | A1* | 6/2015 | Subramanian | H04L 1/0041 370/230 |
| 2016/0021600 | A1* | 1/2016 | Keller | H04W 76/12 370/329 |
| 2017/0257274 | A1* | 9/2017 | Ahart | H04W 4/50 |
| 2017/0257764 | A1* | 9/2017 | Remmert | H04W 12/009 |
| 2020/0044920 | A1* | 2/2020 | Patterson | H04L 12/2807 |

* cited by examiner

*Primary Examiner* — Nicholas R Taylor
*Assistant Examiner* — Chong G Kim
(74) *Attorney, Agent, or Firm* — Greenberg Traurig, LLP

(57) ABSTRACT

A disclosed apparatus ay include (1) a wireless receiver that facilitates communicatively coupling to a wireless transmitter of an access point connected to a network switch of a service provider, and (2) at least one processing device of a router communicatively coupled to the wireless receiver, wherein the processing device of the router (A) activates a wireless mode that (I) causes the router to establish a wireless connection with the access point via the wireless transmitter and the wireless receiver and (II) facilitates remote configuration of the router by a remote user who has gained access to the router via the wireless connection, (B) receives, via the wireless connection, at least one command from the remote user, and (C) applies, to an out-of-band management interface of the router, the command received from the remote user via the wireless connection. Various other apparatuses systems, and methods are also disclosed.

19 Claims, 6 Drawing Sheets ary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

APPARATUS, SYSTEM, AND METHOD FOR WIRELESSLY ACCESSING MANAGEMENT INTERFACES OF ROUTERS

PRIORITY CLAIM

This application claims priority to Indian Provisional Application No. 202011019691 filed on 9 May 2020 with the Indian Patent Office, the disclosure of which is incorporated in its entirety by this reference.

BACKGROUND

Data centers are often filled with telecommunication devices (such as routers and/or switches) that facilitate the flow of traffic within and across networks. For example, a data center may include and/or accommodate various rows of telecommunication cabinets and/or racks. In this example, each cabinet and/or rack may hold and/or house multiple routers and/or other telecommunications devices that service and/or handle the network needs of users and/or service providers. These routers and/or other telecommunications devices may be connected to one another and/or to external devices or networks by cables (e.g., Ethernet cables, fiber optic cables, etc.).

Many conventional routers within a data center may be equipped with a management interface that relies on a dedicated wired connection (e.g., an Ethernet cable connection) for remote user access. For users to access the management interface of these conventional routers, a dedicated wired connection may be established and/or made with each conventional router at the data center. Unfortunately, the cumulative effect of all these wired connections may add to the congestion arising from the cables running among the various routers and/or other telecommunications devices installed in the cabinets and/or racks.

Furthermore, the space available in some data centers may be limited due to tight quarters and/or numerous telecommunication cabinets and/or racks. The combination of limited space and large quantities of cables strewn throughout these data centers may lead to and/or result in a potentially messy, unorganized, and/or hassle-prone environment. The cost of maintaining and/or provisioning all the telecommunication cabinets and/or racks as well as their corresponding cables may be expensive.

The instant disclosure, therefore, identifies and addresses a need for additional and improved apparatuses, systems, and methods for wirelessly accessing management interfaces of routers.

SUMMARY

As will be described in greater detail below, the instant disclosure generally relates to apparatuses, systems, and methods for wirelessly accessing management interfaces of routers. In one example, an apparatus for accomplishing such a task may include (1) a wireless receiver that facilitates communicatively coupling to a wireless transmitter of an access point connected to a network switch of a service provider, (2) at least one processing device of a router communicatively coupled to the wireless receiver, wherein the processing device of the router (A) activates a wireless mode that (I) causes the router to establish a wireless connection with the access point via the wireless transmitter and the wireless receiver and (II) facilitates remote configuration of the router by a remote user who gains access to the router via the wireless connection, (B) receives, via the wireless connection, at least one command from the remote user, and (C) applies, to an out-of-band management interface of the router, the command received from the remote user via the wireless connection.

Similarly, a system that facilitates wirelessly accessing management interfaces of routers may include (1) a wireless receiver that facilitates communicatively coupling to a wireless transmitter of an access point connected to a network switch of a service provider and (2) at least one processing device of a router communicatively coupled to the receiver, wherein the processing device of the router (A) activates a wireless mode that (I) causes the router to establish a wireless connection with the access point via the wireless transmitter and the wireless receiver and (II) facilitates remote configuration of the router by a remote user who has gained access to the router via the wireless connection, (B) receives, via the wireless connection, at least one command from the remote user, and (C) applies, to an out-of-band management interface of the router, the command received from the remote user via the wireless connection.

Additionally or alternatively, a method for wirelessly accessing management interfaces of routers may include (1) activating a wireless mode of a router equipped with a wireless receiver, (2) establishing a wireless connection between the router and an access point connected to a network switch of a service provider by communicatively coupling the wireless receiver of the router to a wireless transmitter of the access point, and (3) enabling a remote user to remotely configure the router via the wireless connection between the router and the access point by (A) receiving, via the wireless connection, at least one command from the remote user and (B) applying, to an out-of-band management interface of the router, the command received from the remote user via the wireless connection.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
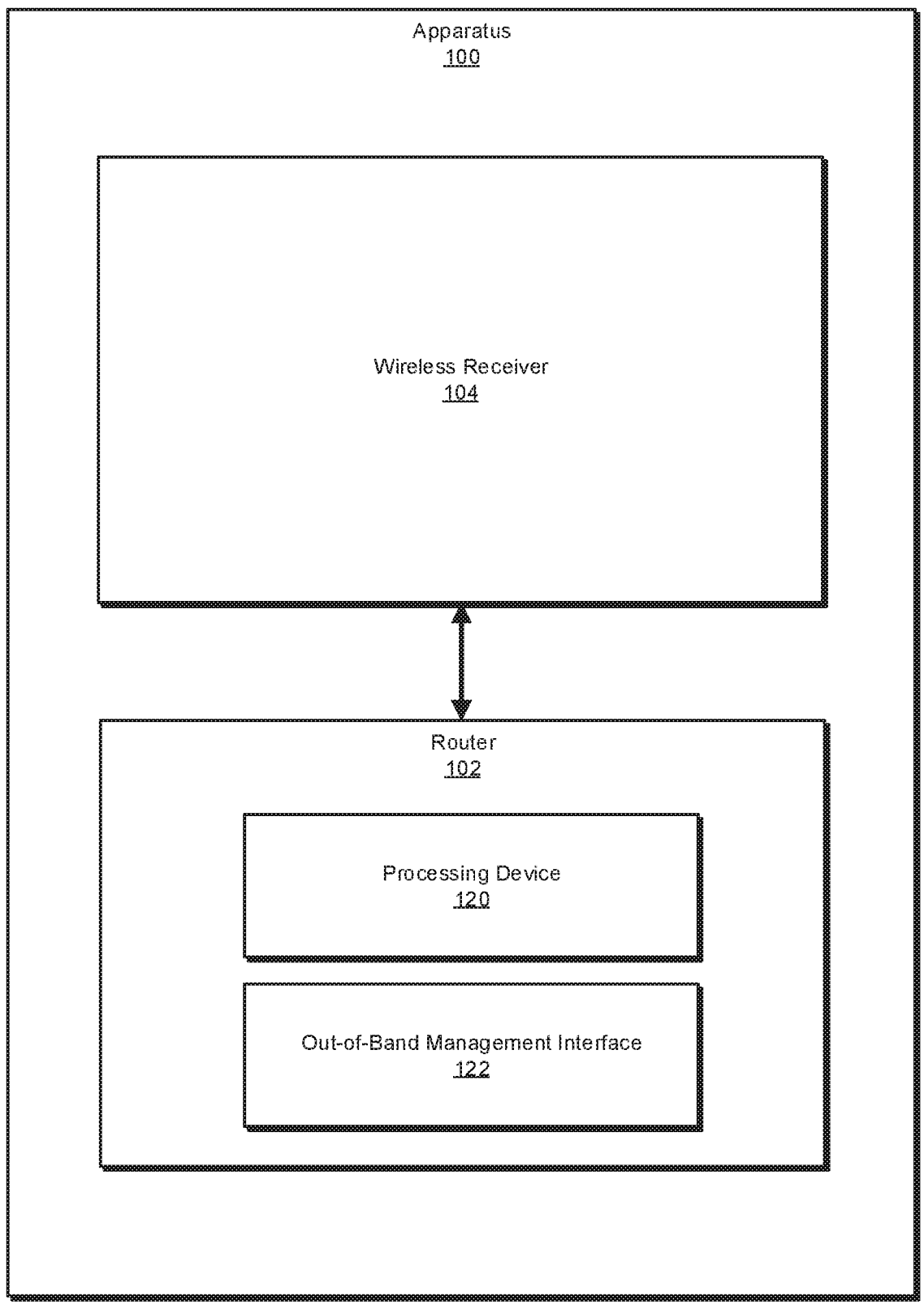
FIG. 1 is a block diagram of an exemplary apparatus for wirelessly accessing management interfaces of routers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for wirelessly accessing management interfaces of routers. As will be explained in greater detail below, the various apparatuses, systems, and methods described herein may provide various benefits and/or advantages over some traditional management interface technologies. For example, the various apparatuses systems, and methods described herein may involve and/or rely on a wireless receiver incorporated into a router at a data center. In this example, the wireless receiver may enable the router to wirelessly communicate with an access point at the data center. The access point may be communicatively coupled to a network switch that links the data center to the network of a remote user who has some sort of responsibility and/or authority over the router.

Continuing with this example, the remote user may be able to access the router's management interface from his or her network via the wireless receiver, as opposed to via a traditional wired connection. By doing so, the remote user may be able to perform various tasks and/or actions in connection with the router without the need for a wired connection to the router's management interface. Examples of such tasks and/or actions include, without limitation, configuring or modifying user profiles on a router, configuring or modifying in-band network interfaces of a router, configuring or modifying services and/or filters implemented on a router, configuring or modifying event triggers and/or monitors on a router, configuring or modifying settings and/or keys on a router, combinations or variations of one or more of the same, and/or any other suitable tasks and/or actions.

Accordingly, the various apparatuses, systems, and methods described herein may eliminate the need for and/or use of a wired connection for remotely accessing the management interface of a router. This elimination of such a wired connection may lead to and/or provide various benefits and/or advantages over some traditional management interface technologies. For example, these apparatuses, systems, and methods may help reduce and/or mitigate the messiness and/or hassle of maintaining or provisioning the telecommunication cabinets and/or racks at data centers. Additionally or alternatively, these apparatuses, systems, and methods may reduce and/or mitigate the cable costs at data centers and/or the costs associated with maintaining or provisioning the cabling at data centers.

The following will provide, with reference to FIGS. 1, 2, 4, and 5, detailed descriptions of exemplary apparatuses, systems, and corresponding implementations for wirelessly accessing management interfaces of routers. Detailed descriptions of an exemplary method for wirelessly accessing management interfaces of routers will be provided in connection with FIG. 3. In addition, detailed descriptions of an exemplary computing system for carrying out such a method will be provided in connection with FIG. 6.

FIG. 1 shows an exemplary apparatus 100 that facilitates wirelessly accessing management interfaces of routers. As illustrated in FIG. 1, apparatus 100 may include and/or represent a wireless receiver 104 and/or a processing device 120 of router 102. In one example, wireless receiver 104 may facilitate communicatively coupling router 102 to a wireless transmitter of an access point connected to a network switch of a service provider. In this example, processing device 120 of router 102 may be communicatively coupled to wireless receiver 104.

In one example, processing device 120 of router 102 may activate a wireless mode that (1) causes router 102 to establish a wireless connection with the access point via the wireless transmitter and wireless receiver 104 and (2) facilitates remote configuration of router 102 by a remote user who has gained access to router 102 via the wireless connection. In this example, processing device 120 of router 102 may receive, via the wireless connection, at least one command from the remote user. Processing device 120 of router 102 may then apply, to an out-of-band management interface of router 102, the command received from the remote user via the wireless connection.

Processing device 120 generally represents any type or form of hardware-implemented processor capable of interpreting and/or executing computer-readable instructions. In one example, processing device 120 may access and/or modify one or more of software modules and/or computer-readable instructions stored in memory for the purpose of facilitating wireless access to management interfaces of routers. Examples of processing device 120 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

Although FIG. 1 illustrates wireless receiver 104 as being external to router 102, wireless receiver 104 may additionally or alternatively represent part of and/or be included within router 102. For example, apparatus 100 may constitute and/or represent a portion of router 102 that includes processing device 120 and/or wireless receiver 104. In addition, apparatus 100 may include and/or incorporate one or more additional components that are not explicitly represented and/or illustrated in FIG. 1. Examples of such additional components include, without limitation, other physical processors, memory devices, circuitry, transistors, resistors, capacitors, diodes, transceivers, circuit boards, combinations or variations of one or more of the same, and/or any other suitable components that may help facilitate wirelessly accessing management interfaces of routers.

In some examples, wireless receiver 104 may represent part of and/or be included within a wireless transceiver capable of transmitting and/or receiving data via wireless communications. In other examples, wireless receiver 104 may constitute and/or represent part a stand-alone receiver unit capable of receiving data via wireless communications. In any case, wireless receiver 104 may implement and/or operate any suitable communication protocols in the transmission and/or reception of data via wireless connections.

In some examples, router 102 may constitute and/or represent a physical computing device that forwards traffic within a network and/or across network. For example, router 102 may include and/or represent as a Customer Edge (CE) router, a Provider Edge (PE) router, a hub router, a spoke router, an Autonomous System (AS) boundary router, and/or an area border router. Additionally or alternatively, router 102 may be communicatively coupled to one or more switches, hubs, modems, bridges, repeaters, gateways, network racks, servers, computers, laptops, and/or desktops at a data center and/or in connection with a service provider. In one example router 102 may include and/or implement one or more of software modules, routing engines, and/or packet forwarding engines.

As illustrated in FIG. 1, router 102 may include and/or represent an out-of-band management interface 122. In some examples, the term "out-of-band" may refer to any component and/or process that is dedicated to serving router 102 in connection with the control plane (e.g., control data and/or management traffic). In contrast, the term "in-band" may refer to any component and/or process that is dedicated to serving router 102 in connection with the forwarding plane (e.g., customer data and/or user traffic). Accordingly, out-of-band management interface 122 may include and/or represent any management interface and/or port through which a network administrator is able to configure and/or modify certain settings or features of router 102 via out-of-band traffic, as opposed to in-band traffic.

In some examples, router 102 may be accessible via at least two connection mechanisms (e.g., a console connection and/or a management connection). For example, router 102 may include and/or incorporate a console port that facilitates access to router 102 irrespective of its operating state (unless router 102 is powered off). By connecting to this console port, a user may be able to access the root level of router 102 without using any network to which router 102 is connected. In one example, the console connection may provide persistent direct access to router 102 even if the router's primary network has failed. The console connection may enable a network administrator to modify and/or configure router 102 upon its initial bootup and/or setup.

In another example, router 102 may include and/or incorporate a management interface that serves as the primary interface for accessing router 102 remotely. In this example, the management interface may be unconnected from the router's in-band network and may instead be connected to the router's internal network. By connecting to the management interface, a user may be able to access router 102 over the network using utilities like Secure Shell (SSH) and/or Telnet. By doing so, the user may be able to configure and/or modify router 102 from anywhere irrespective of the router's physical location. In one example, the user may be able to collect and/or retrieve statistics from router 102 via Simple Network Management Protocol (SNMP).

In some examples, the management interface may enable authorized users and/or management systems to connect to router 102 over the network. In such examples, router 102 may be unable to route traffic between the management interface and other in-band interfaces. Accordingly, router 102 may be configured by assigning an IP address from a separate logical network with a separate prefix (netmask). Through the management connection, the user may be able to perform any sort of operations, administration, and/or maintenance without using the console connection.

Figure 2:
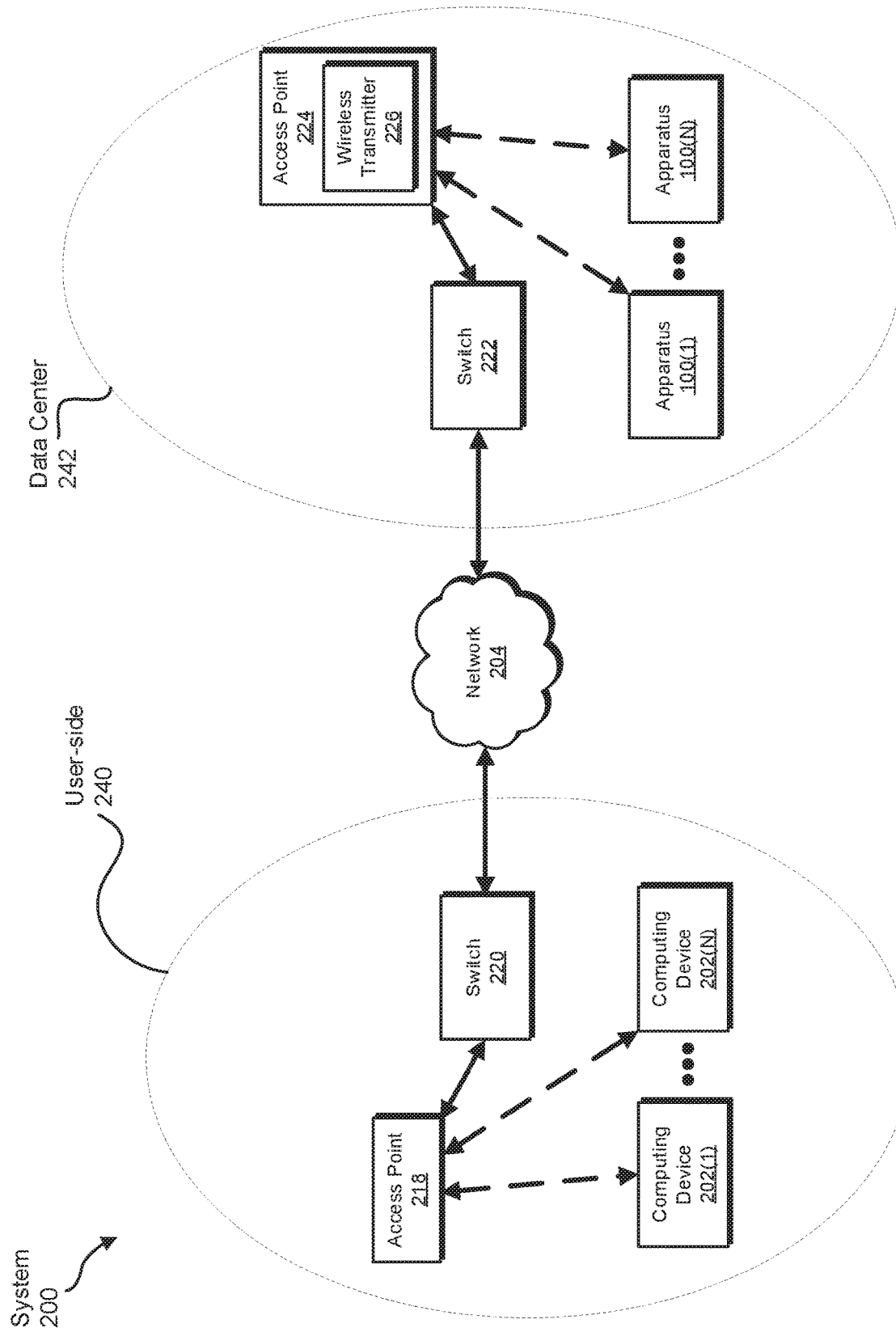
FIG. 2 is a block diagram of an exemplary system for wirelessly accessing management interfaces of routers.

In some examples, apparatus 100 in FIG. 1 may be implemented in a variety of ways. For example, all or a portion of exemplary apparatus 100 may represent portions of exemplary system 200 in FIG. 2. As shown in FIG. 2, system 200 may include and/or represent a user-side 240 and a data center 242 communicatively coupled to one another via a network 204. In one example, user-side 240 may include and/or represent a group of one or more computing devices 202(1)-(N), an access point 218, and/or a switch 220. In this example, data center 242 may include and/or represent a group of one or more apparatuses 100(1)-(N), an access point 224 equipped with a wireless transmitter 226, and/or a switch 222.

As illustrated in FIG. 2, user-side 240 may be assembled and/or configured such that access point 218 is communicatively coupled and/or connected to computing devices 202(1)-(N). In one example, user-side 240 may be further assembled and/or configured such that access point 218 is communicatively coupled and/or connected to switch 220. In this example, switch 220 of user-side 240 may be communicatively coupled and/or linked to switch 222 of data center 242 via network 204. Although not illustrated in this way in FIG. 2, switch 220 of user-side 240 may alternatively be communicatively coupled and/or linked to switch 222 of data center 242 by direct connection.

As illustrated in FIG. 2, data center 242 may be assembled and/or configured such that access point 224 is communicatively coupled and/or connected to apparatuses 100(1)-(N). In one example, data center 242 may be further assembled and/or configured such that access point 224 is communicatively coupled and/or connected to switch 222. Accordingly, switch 222 may be communicatively coupled to switch 220, which is connected to access point 218, thereby enabling a remote user operating one of computing devices 202(1)-(N) to gain remote access to a router associated with one of apparatuses 100(1)-(N) via a wireless connection established between access point 224 and that apparatus.

In some examples, network 204 may include and/or represent various network devices that form and/or establish communication paths and/or segments between user-side 240 and data center 242. Moreover, user-side 240, data center 242, and/or network 204 may include and/or represent certain network devices and/or computing devices that are not explicitly illustrated in FIG. 2.

In some examples, and as will be described in greater detail below, one or more of software modules and/or computer-readable instructions may cause one or more of apparatuses 100(1)-(N) to (1) activate a wireless mode of a corresponding router equipped with a wireless receiver, (2) establish a wireless connection between the router and access point 224 connected to switch 222 at data center 242 by communicatively coupling the wireless receiver of the router to wireless transmitter 226 of access point 224, and (3) enabling a remote user operating one of computing devices 202(1)-(N) at user-side 240 to remotely configure the router via the wireless connection between the router and access point 224 by (A) receiving, via the wireless connection, at least one command from the remote user and (B) applying, to an out-of-band management interface of the router, the command received from the remote user via the wireless connection.

Access points 218 and 224 may represent any type or form computing device capable of facilitating the flow of control and/or forwarding data within networks and/or across networks. In one example, access point 218 and/or access point 224 may include and/or represent a WIFI router. Additional examples of access points 218 and 224 include, without limitation, wireless access points, network devices, routers, wireless routers, controllers, switches, hubs, modems, Digital Subscriber Lines (DSL) modems, voice-band modems, gateways, Boarder Network Gateways (BNGs), Broadband Remote Access Servers (BRASes), single-band routers, dual-band routers, edge routers, subscriber edge routers, inter-provider border routers, core routers, portions of one or more the same, combinations or variations of one or more of the same, or any other suitable access point.

Switches 220 and 222 may represent any type or form of computing device capable of facilitating the flow of control or forwarding data and/or linking one network with another network. In one example, switch 220 may include and/or represent a Local Area Network (LAN) switch for user-side 240. Additionally or alternatively, switch 222 may include and/or represent a LAN switch for data center 242.

Computing devices 202(1)-(N) may each represent any type or form of physical computing device capable of reading computer-executable instructions. Examples of computing devices 202(1)-(N) include, without limitation, client devices, laptops, tablets, desktops, servers, cellular phones Personal Digital Assistants (PDAs), multimedia players, embedded systems, wearable devices, gaming consoles, variations or combinations of one or more of the same, and/or any other suitable devices.

Network 204 generally represents any medium or architecture capable of facilitating communication or data transfer. In some examples, network 204 may include other devices not illustrated in FIG. 2 that facilitate communication and/or form part of segment routing paths. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a LAN, a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
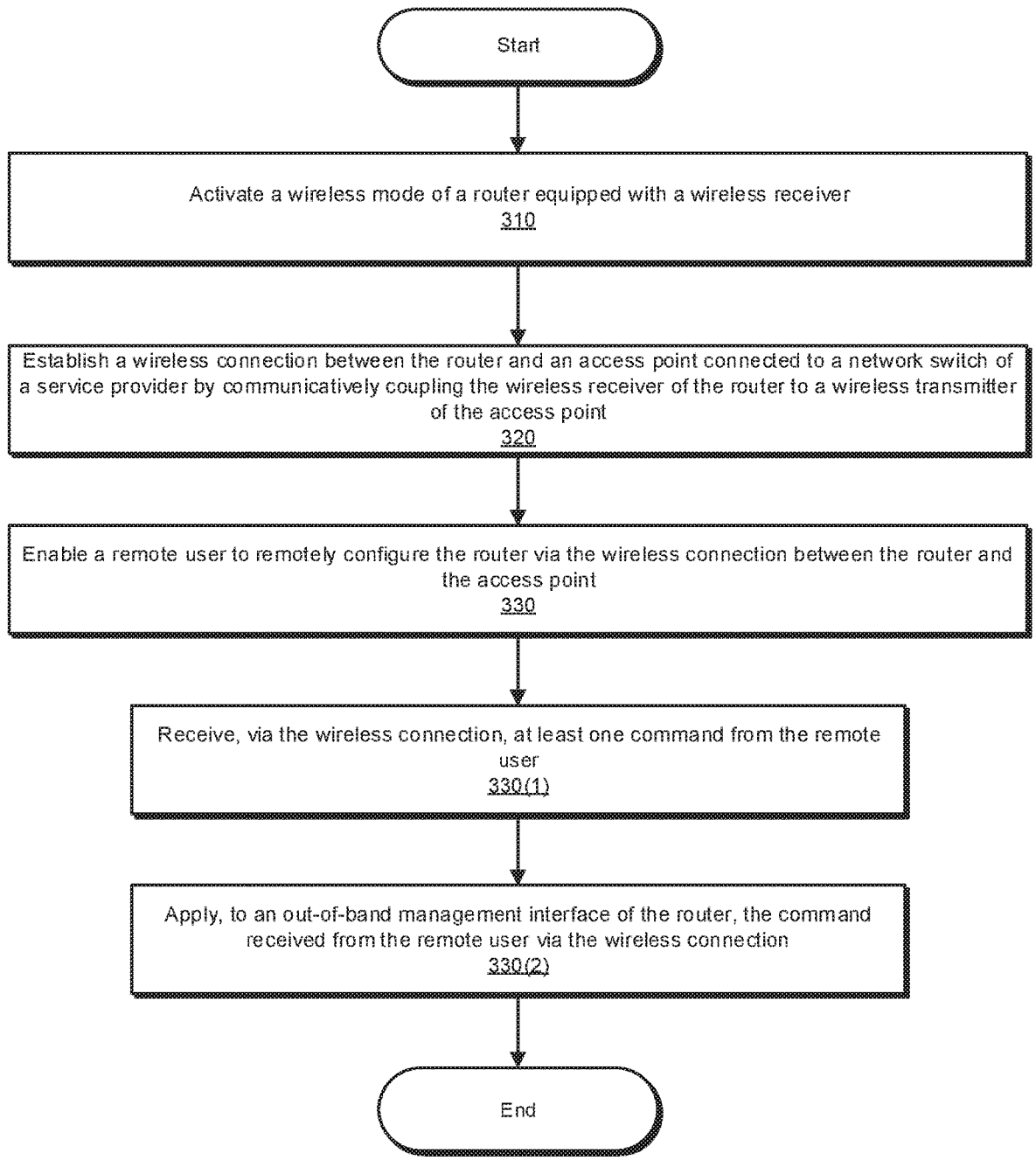
FIG. 3 is a flow diagram of an exemplary method for wirelessly accessing management interfaces of routers.

FIG. 3 is a flow diagram of an exemplary computer-implemented method 300 for wirelessly accessing management interfaces of routers. The steps shown in FIG. 3 may be performed by any suitable computer-executable code and/or computing system, including apparatus 100 in FIG. 1, system 200 in FIG. 2, system 5 in FIG. 5, the devices illustrated in implementation 500 in FIG. 5, system 600 in FIG. 6, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may activate a wireless mode of a router equipped with a wireless receiver. For example, processing device 120 may, as part of apparatus 100(1) in FIG. 2, activate a wireless mode of router 102 equipped with wireless receiver 104. As will be described in greater detail below, this wireless mode of router 102 may enable router 102 to establish a wireless connection with access point 224 via wireless receiver 104 and/or wireless transmitter 226. This wireless mode may involve and/or support any kind of wireless communication protocol in connection with router 102.

The systems described herein may perform step 310 in a variety of ways and/or contexts. In some examples, processing device 120 of router 102 may initiate the activation of the wireless mode as part of the router's bootup process and/or immediately upon powerup. In other examples, processing device 120 of router 102 may initiate the activation of the wireless mode in response to user input that calls for the wireless mode and/or a certain activation event or trigger. In one example, the wireless mode may cause router 102 to establish the wireless connection with access point 224 via wireless receiver 104 and/or wireless transmitter 226. Additionally or alternatively, the wireless mode may facilitate remote configuration of router 102 by the remote user.

Returning to FIG. 3, at step 320 one or more of the systems described herein may establish a wireless connection between the router and an access point connected to a network switch of a service provider by communicatively coupling the wireless transceiver of the router to a wireless transmitter of the access point. For example, processing device 120 may, as part of apparatus 100(1) in FIG. 2, establish a wireless connection between router 102 and access point 224, which is connected to switch 222 at data center 242 in FIG. 2. In this example, processing device 120 may establish this wireless connection by communicatively coupling wireless receiver 104 of router 102 to wireless transmitter 226 of access point 224.

The systems described herein may perform step 320 in a variety of ways and/or contexts. In some examples, processing device 120 may direct router 102 to make contact with and/or ping access point 224 via an onboard wireless transmitter. For example, processing device 120 may direct router 102 to send a request for an IP address for out-of-band management interface 122 to access point 224 via that onboard wireless transmitter. In response, access point 224 may assign an IP address to out-of-band management interface 122 of router 102. Access point 224 may then send a communication that identifies the IP address assigned to out-of-band management interface 122 to router 102 via wireless transmitter 226. As this communication arrives at router 102, processing device 120 may apply the IP address identified in the communication to out-of-band management interface 122. This IP address applied to out-of-band management interface 122 may facilitate remote access by a user at user-side 240 to out-of-band management interface 122 via the wireless connection.

Figure 4:
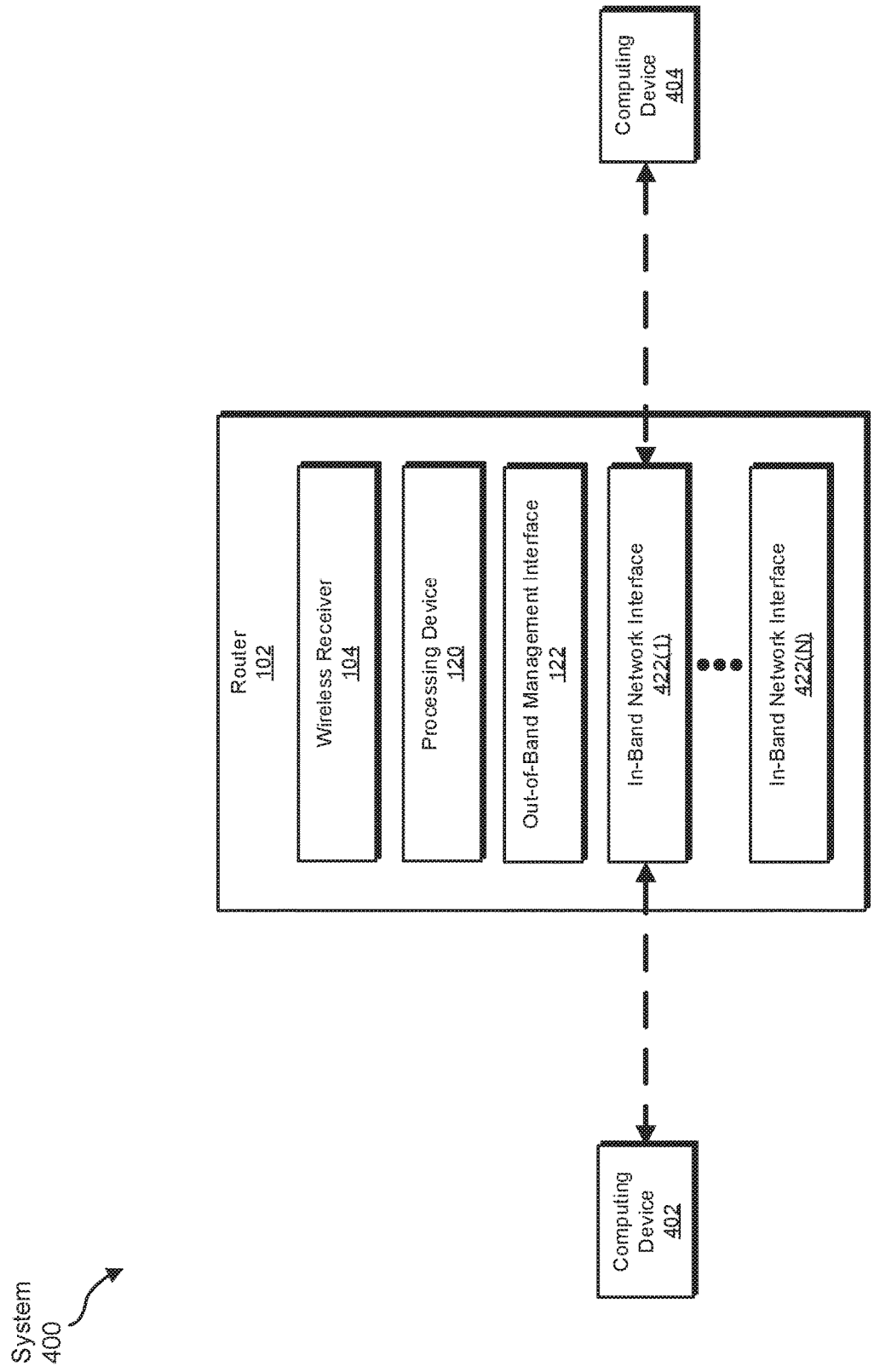
FIG. 4 is a block diagram of an additional exemplary system for wirelessly accessing management interfaces of routers.

In some examples router 102 may include and/or represent one or more in-band network interfaces that are separate and/or distinct from out-of-band management interface 122. FIG. 4 illustrates an exemplary system 400 that includes and/or represents an implementation of router 102 in communication with computing devices 402 and 404. As illustrated in FIG. 4, router 102 may include and/or incorporate wireless receiver 104, processing device 120, out-of-band management interface 122, and/or in-band network interfaces 422(1)-(N). In one example, in-band network interfaces 422(1)-(N) may receive and/or forward in-band traffic in connection with router 102. In this example, such in-band traffic may include data and/or packets exchanged between computing devices 402 and 404.

In some examples, in-band network interfaces 422(1)-(N) may each include and/or represent an optical module. Examples of such optical modules include, without limitation, Small Form-Factor pluggable (SFP) modules, Quad SFP (QSFP) modules, QSFP Double Density (DD) modules (e.g., QSFP-DD 400G modules), combinations or variations of one or more of the same, and/or any other suitable optical modules. In one example, in-band network interfaces 422(1)-(N) may support SONET, GIGABIT ETHERNET, FIBRE CHANNEL, and/or other communications standards. In this example, in-band network interface 422(1) may be communicatively coupled to computing devices 402 and 404 via a fiber optic, copper, and/or other network cable.

In this way, in-band network interface 422(1) may facilitate the flow of customer and/or user traffic between computing devices 402 and 404.

In some examples, processing device 120 may direct router 102 to send a request for IP addresses for in-band network interfaces 422(1)-(N) to access point 224 via the onboard wireless transmitter. In response, access point 224 may assign an IP address to each of in-band network interfaces 422(1)-(N) on router 102. Access point 224 may then send one or more communications that identify the IP addresses assigned to in-band network interfaces 422(1)-(N) to router 102 via wireless transmitter 226. As this communication arrives at router 102, processing device 120 may apply the IP addresses identified in the communications to in-band network interfaces 422(1)-(N). These IP addresses applied to in-band network interfaces 422(1)-(N) may facilitate forwarding in-band data and/or traffic to various computing devices (e.g., computing devices 402 and 404, etc.) communicatively coupled to router 102 through in-band network interfaces 422(1)-(N).

Returning to FIG. 3, at step 330 one or more of the systems described herein may enable a remote user to remotely configure the router via the wireless connection between the router and the access point. For example, processing device 120 may, as part of apparatus 100(1) in FIG. 2, enable a remote user operating one of computing devices 202(1)-(N) at user-side 240 to gain remote access to router 102 and/or remotely configure router 102 via the wireless connection. In this example, the remote user may be able to access out-of-band management interface 122 from user-side 240 via the wireless connection, as opposed to via a traditional wired connection between router 102 and access point 224. By doing so, the remote user may be able to perform various tasks and/or actions in connection with router 102 without the need for a traditional wired connection between router 102 and access point 224.

The systems described herein may perform step 330 in a variety of ways and/or contexts. In some examples, processing device 120 may enable such remote access to and/or configuration of router 102 by, at step 330(1) in FIG. 3, receiving at least one command from the remote user via the wireless connection and then, at step 330(2) in FIG. 3, applying the command to out-of-band management interface 122 of router 102. Various types of protocols may used and/or implemented to send and/or receive commands from the remote user. For example, processing device 120 of router 102 may receive the command via a cryptographic network protocol, such as Secure Shell (SSH). Additionally or alternatively, processing device 120 of router 102 may receive the command via an application protocol, such as Telnet.

The command may cause and/or direct router 102 to perform various tasks, operations and/or actions via out-of-band management interface 122. For example by executing and/or launching the command, processing device 120 may identify one or more traffic statistics of router 102 requested by the remote user. In this example, processing device 120 may then send those traffic statistics to the remote user via the wireless connection. As another example, by executing and/or launching the command, processing device 120 may identify information requested by the user about one or more of in-band network interfaces 422(1)-(N) of router 102. In this example, processing device 120 may then send that information about the one or more of in-band interfaces 422(1)-(N) to the remote user via the wireless connection.

By executing and/or launching the command, processing device 120 may also perform a number of other tasks, operations, and/or actions. For example, the command may cause and/or direct processing device 120 to configure and/or modify a user profile implemented on router 102, the status of an in-band network interface on router 102, the status of a service and/or application implemented on router 102, a filter implemented on router 102, an event trigger implemented on router 102, an event monitor implemented on router 102, combinations or variations of one or more of the same, and/or any other suitable tasks, operations, and/or actions.

Figure 5:
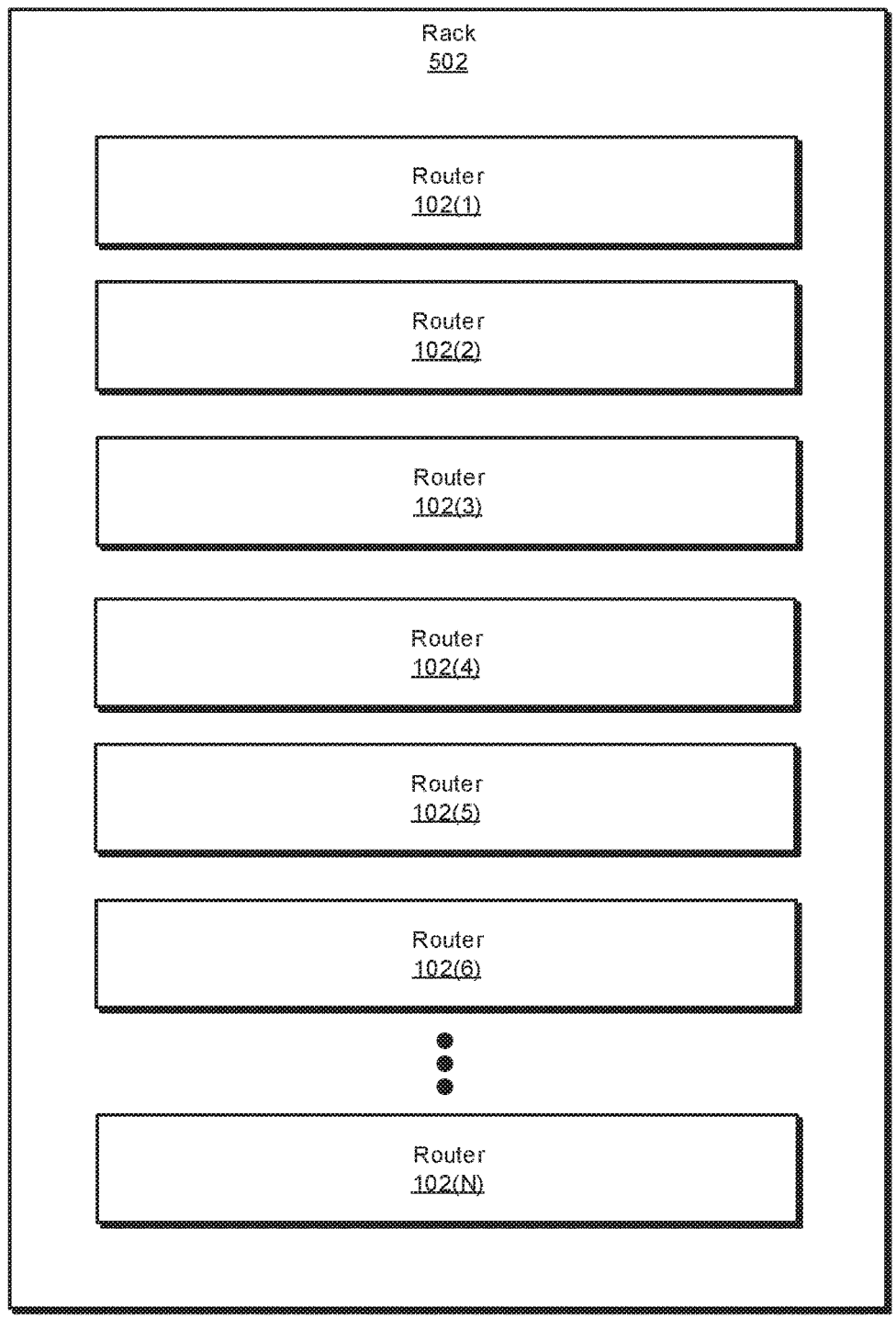
FIG. 5 is a block diagram of an exemplary implementation of an apparatus for wirelessly accessing management interfaces of routers.

FIG. 5 illustrates an exemplary implementation 500 that includes and/or represents routers 102(1), 102(2), 102(3), 102(4), 102(5), and 102(6)-(N) installed and/or housed in a rack 502. In implementation 500, routers 102(1)-(N) may include in-band network interfaces that are connected to one another and/or to other computing devices via wired connections and/or physical cabling. However, routers 102(1)-(N) may each implement and/or incorporate an out-of-band management interface that does not rely on a wired connection and/or physical cabling. Instead, each out-of-band management interface may send and/or receive out-of-band traffic for configuring and/or modifying routers 102(1)-(N) via a wireless transceiver.

By doing so, routers 102(1)-(N) may eliminate the need for and/or use of wired connections for remotely accessing the out-of-band management interface. This elimination of such wired connections may lead to and/or provide various benefits and/or advantages over some traditional management interface technologies. For example, routers 102(1)-(N) may help reduce and/or mitigate the messiness and/or hassle of maintaining or provisioning rack 502 in FIG. 5 at a data center. Additionally or alternatively, rack 502 may reduce and/or mitigate the cable costs at the data center and/or the costs associated with maintaining or provisioning the cabling at the data center.

Figure 6:
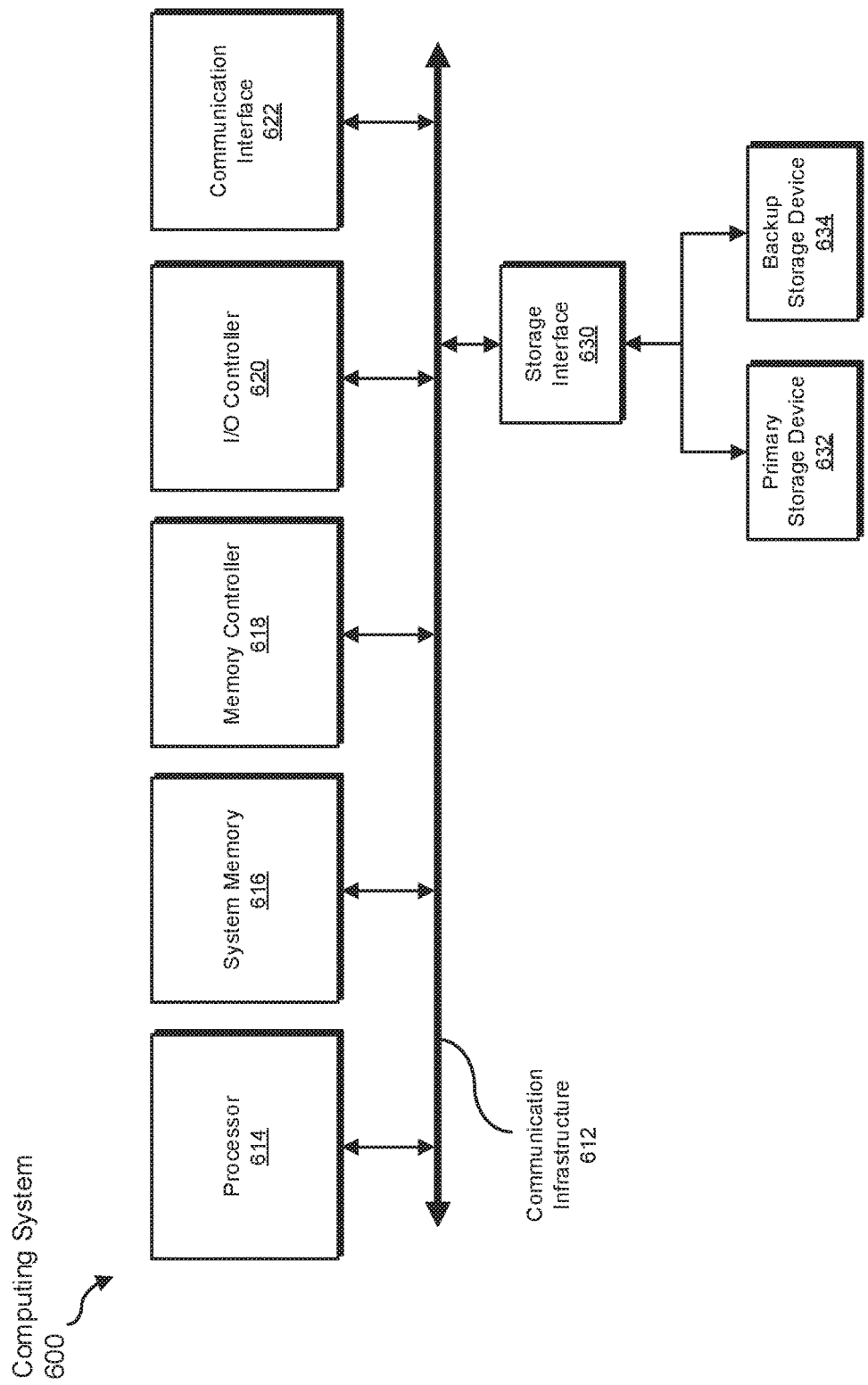
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620 and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (DATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
a wireless receiver that facilitates communicatively coupling to a wireless transmitter of an access point connected to a network switch of a data center, the network switch of the data center being communicatively coupled to a user-side switch connected to a user-side access point that enables a remote user to gain access to a router via a wireless connection with the access point; and
at least one processing device of the router communicatively coupled to the wireless receiver, wherein the processing device of the router:
activates a wireless mode that:
causes the router to establish the wireless connection with the access point at the data center via the wireless transmitter and the wireless receiver, wherein:
the wireless connection is dedicated to servicing management traffic for the router via a control plane; and
a wired connection established between the router and the access point is dedicated to servicing user traffic for the router sent via a forwarding plane that is distinct from the control plane; and
facilitates remote configuration of the router by the remote user who gains access to the router via the wireless connection at the data center;
receives, via the wireless connection at the data center, at least one command from the remote user; and
applies, to an out-of-band management interface of the router, the command received from the remote user via the wireless connection to configure at least one setting of the router via the out-of-band management interface.

2. The apparatus of claim 1, wherein the processing device of the router:
receives an Internet Protocol (IP) address from the access point via the wireless connection; and
applies the IP address to the out-of-band management interface to facilitate remote access by the remote user to the out-of-band management interface via the IP address.

3. The apparatus of claim 2, wherein the processing device of the router:
receives at least one additional IP address from the access point via the wireless connection; and
applies the additional IP address to at least one in-band network interface of the router to facilitate forwarding traffic to at least one additional computing device via the in-band network interface.

4. The apparatus of claim 1, wherein the processing device of the router receives the command from the remote user via a cryptographic network protocol.

5. The apparatus of claim 1, wherein the processing device of the router receives the command from the remote user via an application protocol.

6. The apparatus of claim 1, wherein the processing device of the router applies the command to the out-of-band management interface by modifying the setting of the router based at least in part on the command received from the remote user via the wireless connection.

7. The apparatus of claim 1, wherein the processing device of the router applies the command to the out-of-band management interface by:
identifying one or more traffic statistics of the router based at least in part on the command received from the remote user via the wireless connection; and
sending the traffic statistics to the remote user via the wireless connection.

8. The apparatus of claim 1, wherein the processing device of the router applies the command to the out-of-band management interface by:
identifying information about one or more in-band network interfaces of the router based at least in part on the command received from the remote user via the wireless connection; and
sending the information about the in-band network interfaces to the remote user via the wireless connection.

9. The apparatus of claim 1, wherein the processing device of the router applies the command to the out-of-band management interface by configuring or modifying at least one of:
a user profile implemented on the router;
a status of an in-band network interface of the router;
a status of a service implemented on the router;
a filter implemented on the router;
an event trigger implemented on the router; or
an event monitor implemented on the router.

10. A system comprising:
a wireless receiver that facilitates communicatively coupling to a wireless transmitter of an access point connected to a network switch of a data center, the network switch of the data center being communicatively coupled to a user-side switch connected to a user-side access point that enables a remote user to gain access to a router via a wireless connection with the access point; and
at least one processing device of the router communicatively coupled to the wireless receiver, wherein the processing device of the router:
activates a wireless mode that:
causes the router to establish the wireless connection with the access point at the data center via the wireless transmitter and the wireless receiver, wherein:
the wireless connection is dedicated to servicing management traffic for the router via a control plane; and
a wired connection established between the router and the access point is dedicated to servicing user traffic for the router sent via a forwarding plane that is distinct from the control plane; and
facilitates remote configuration of the router by the remote user who gains access to the router via the wireless connection at the data center;
receives, via the wireless connection at the data center, at least one command from the remote user; and
applies, to an out-of-band management interface of the router, the command received from the remote user via the wireless connection to configure at least one setting of the router via the out-of-band management interface.

11. The system of claim 10, wherein the processing device of the router:
receives an Internet Protocol (IP) address from the access point via the wireless connection; and
applies the IP address to the out-of-band management interface to facilitate remote access by the remote user to the out-of-band management interface via the IP address.

12. The system of claim 11, wherein the processing device of the router:
receives at least one additional IP address from the access point via the wireless connection; and
applies the additional IP address to at least one in-band network interface of the router to facilitate forwarding traffic to at least one additional computing device via the in-band network interface.

13. The system of claim 10, wherein the processing device of the router receives the command from the remote user via a cryptographic network protocol.

14. The system of claim 10, wherein the processing device of the router receives the command from the remote user via an application protocol.

15. The system of claim 10, wherein the processing device of the router applies the command to the out-of-band management interface by modifying the setting of the router based at least in part on the command received from the remote user via the wireless connection.

16. The system of claim 10, wherein the processing device of the router applies the command to the out-of-band management interface by:
identifying one or more traffic statistics of the router based at least in part on the command received from the remote user via the wireless connection; and
sending the traffic statistics to the remote user via the wireless connection.

17. The system of claim 10, wherein the processing device of the router applies the command to the out-of-band management interface by:
identifying information about one or more in-band network interfaces of the router based at least in part on the command received from the remote user via the wireless connection; and sending the information about the in-band network interfaces to the remote user via the wireless connection.

18. The system of claim 10, wherein the processing device of the router applies the command to the out-of-band management interface by configuring or modifying at least one of:
- a user profile implemented on the router;
- a status of an in-band network interface of the router;
- a status of a service implemented on the router;
- a filter implemented on the router;
- an event trigger implemented on the router; or
- an event monitor implemented on the router.

19. A method comprising:
- activating a wireless mode of a router equipped with a wireless receiver at a data center;
- establishing a wireless connection between the router and an access point connected to a network switch of the data center by communicatively coupling the wireless receiver of the router to a wireless transmitter of the access point at the data center, wherein:
  - the wireless connection is dedicated to servicing management traffic for the router via a control plane; and
  - the network switch of the data center is communicatively coupled to a user-side switch connected to a user-side access point that enables a remote user to gain access to the router via the wireless connection with the access point;
- establishing a wired connection between the router and the access point connected to the network switch of the data center, the wired connection being dedicated to servicing user traffic for the router sent via a forwarding plane that is distinct from the control plane; and
- enabling the remote user to remotely configure the router via the wireless connection between the router and the access point by:
  - receiving, via the wireless connection at the data center, at least one command from the remote user; and
  - applying, to an out-of-band management interface of the router, the command received from the remote user via the wireless connection to configure at least one setting on the router via the out-of-band management interface.

* * * * *

UNITED STATES PATENT AND TRADEMARK OFFICE
CERTIFICATE OF CORRECTION

PATENT NO. : 11,558,465 B2
APPLICATION NO. : 16/907778
DATED : January 17, 2023
INVENTOR(S) : Balaji Babu It is certified that error appears in the above-identified patent and that said Letters Patent is hereby corrected as shown below:

On the Title Page

Column 2, Abstract, Line 1, after apparatus delete "ay", and insert -- may --

Signed and Sealed this
Twenty-third Day of January, 2024

Katherine Kelly Vidal
*Director of the United States Patent and Trademark Office*